INVENTORS
George W. Plumly
Jack B. Hunnicutt

BY
Wofford & Felsman
ATTORNEYS

Sept. 20, 1971  G. W. PLUMLY ET AL  3,605,289
METHOD AND APPARATUS INCORPORATING ELECTRONIC COMPONENTS FOR
PROGRAMED INSTRUCTION AND TESTING
Filed May 8, 1969  6 Sheets-Sheet 8
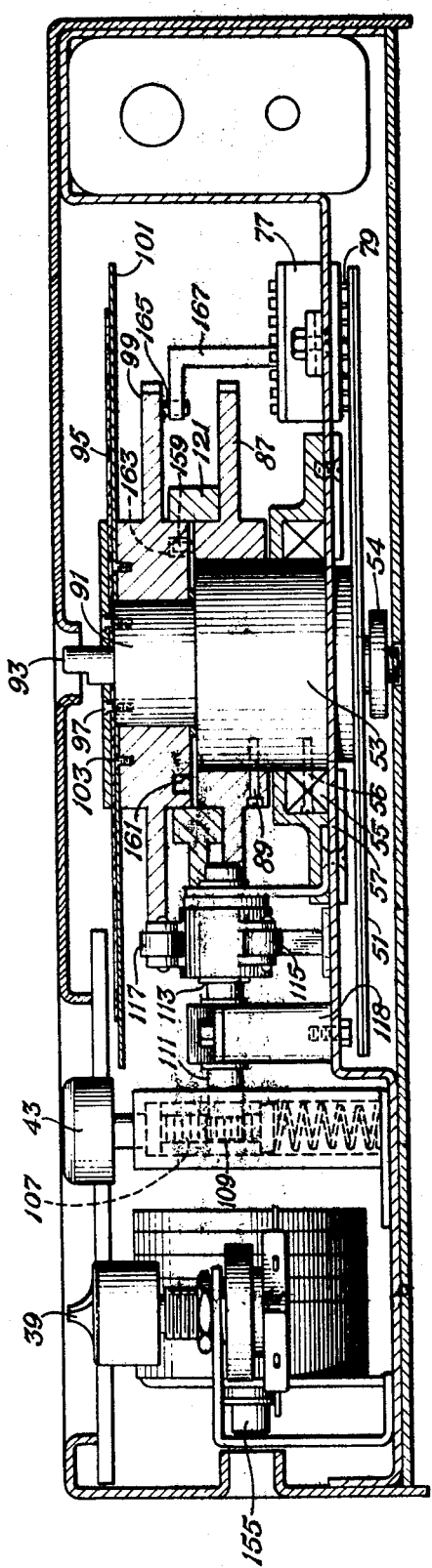
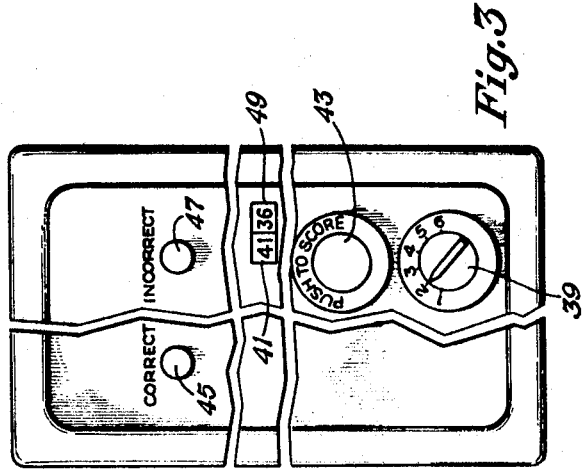
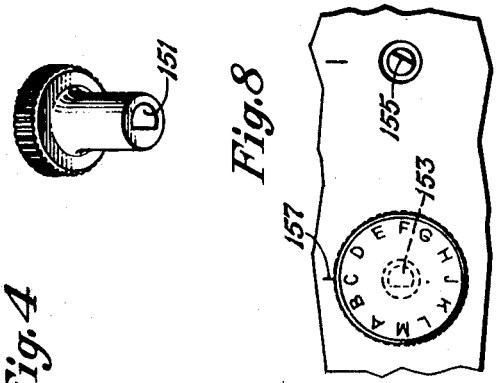
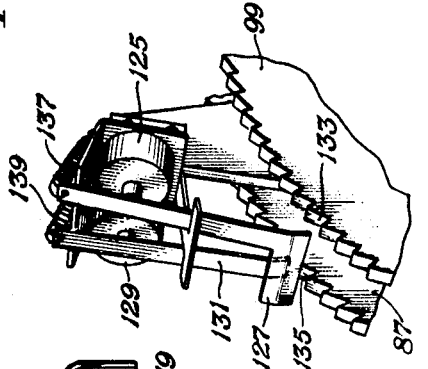
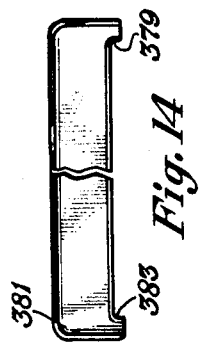
INVENTORS
George W. Plumly
Jack B. Hunnicutt
BY Wofford & Felsman
ATTORNEYS

United States Patent Office 3,605,289
Patented Sept. 20, 1971

3,605,289
METHOD AND APPARATUS INCORPORATING ELECTRONIC COMPONENTS FOR PROGRAMED INSTRUCTION AND TESTING
George W. Plumly and Jack B. Hunnicutt, Fort Worth, Tex., assignors to Edu-Tronics Corporation, Fort Worth, Tex.
Filed May 8, 1969, Ser. No. 823,124
Int. Cl. G09b 7/08
U.S. Cl. 35—9R          42 Claims

ABSTRACT OF THE DISCLOSURE

A method of, and system for, programed instruction characterized by providing a method and a system in which the teacher selects a program and provides a series of problems arranged in accordance with the program; sets a programing network to effect the program and gives the test to the student; the student selects and registers answers in accordance with the problems and the mode selected by the teacher; in the tutor mode the student is advised that his answer is incorrect until he selects and registers the correct answer and then is advanced to the next problem; in the test and grade mode, the student is advised that his answer is correct or incorrect, the correct answers are counted and he is advanced to the next problem; and in the tutor, test and grade mode, the student is advised that each answer is correct or incorrect, his first answer to a problem is scored as a correct answer if it is correct and the student is required to utimately select a correct answer before he can proceed to the next problem, although a later correct answer will not be given credit. Also disclosed are the mechanical and electronic means, and details and embellishments of each of the means that facilitate use of the invention.

BACKGROUND OF THE INVENTION (1) Field of the invention

This invention relates to programed instruction or question-and-answer games. More particularly, this invention relates to programed instruction wherein it is desirable to afford both teaching and testing and grading.

(2) Description of the prior art

The prior art is replete with devices for testing of students. The prior art devices range the gamut from simple devices for pre-school children in which a given question block will have matching electrical connections on an answer block to energize a lamp when the question and answer blocks are matched, to highly complex electronic teaching and testing stations interconnected in a network with a central broadcasting station. Included as intermediate type teaching and testing systems are those employing slide projectors to project material followed by question and answer sequences, having reversing relays and offering the student a variety of programed material in the form of slides for the projector; and less elaborate programable machines offering some options and employing; for example, four cylinders which can be rotated to set one of several available programs into the machine.

The very number and variety of devices available in the prior art attest, in a way, to the lack of a satisfactory solution to the problem. For example, the prior art devices failed to satisfy the needs for one or more of the following reasons:

(1) They failed to offer adequate flexibility to the teacher to achieve a realistic learning situation at the level of secondary education or higher;

(2) They were so simple in concept and had so few programs available that the student found it easier to master the machine rather than the material sought to be taught;

(3) They gave visual evidence to the student of the specific program under which he was being tested so that in a short time the student had mastered the problem-correct answer sequence for a given program and would thereafter play the machine instead of answering the material;

(4) They were so elaborate and expensive as to be prohibited by a mass education system; such as, the public schools; or (5) They required an unduly large amount of the teacher's time to correctly encode the program, fit the program to the test, or to reset the device after a given student had finished using the device.

BRIEF DESCRIPTION OF THE DRAWINGS

FIG. 3 is a plan view of an exterior cabinet employed in one embodiment of the invention.

FIG. 4 is a side view of one embodiment of the invention.

FIG. 7 is an isometric view of an engaging means mounted on the bolt means in one embodiment illustrated in FIGS. 4 and 5.

FIG. 8 is an isometric view of a separable setting means of one embodiment of the invention.

FIG. 9 is an end view of a cabinet showing the separable setting means inserted on one of the shafts of switches employed in one embodiment of the invention.

FIG. 14 is a top end view of the embodiment of FIG. 3.

DESCRIPTION OF PREFERRED EMBODIMENTS

Figure 1:
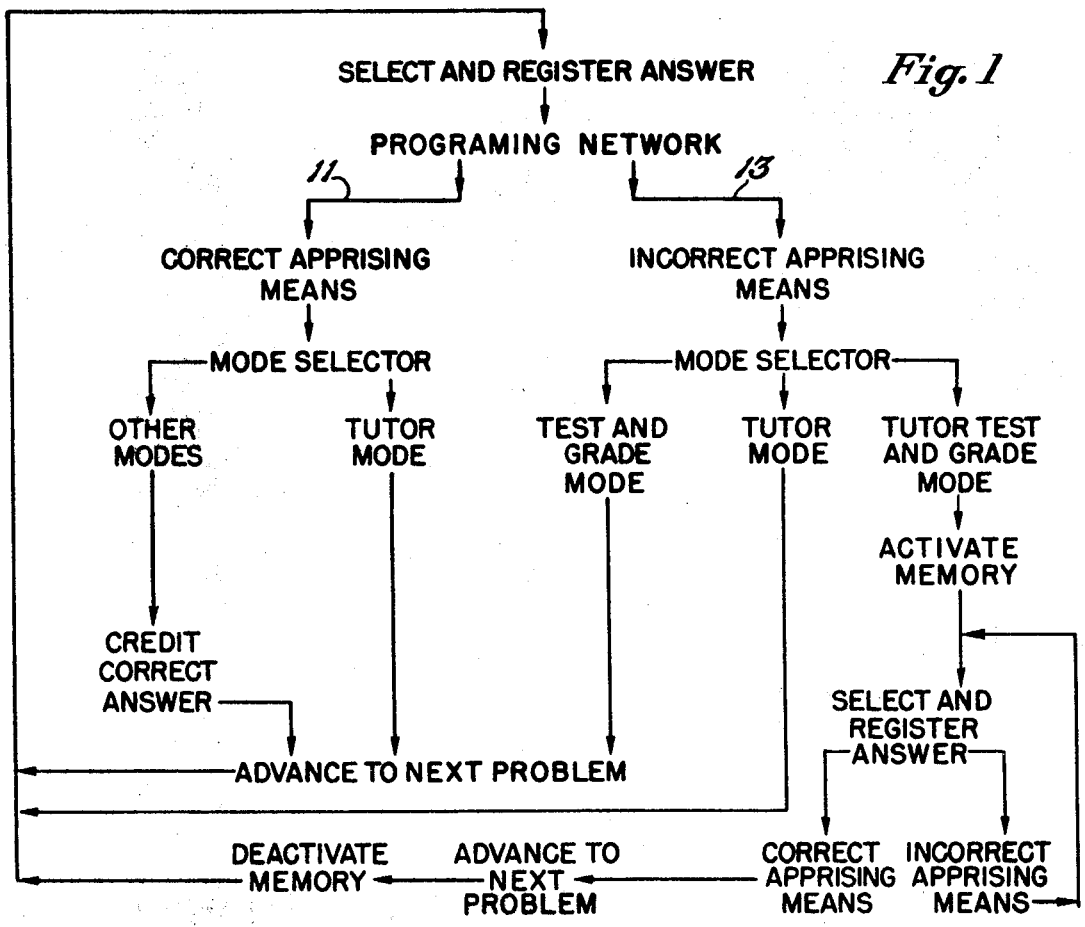
FIG. 1 is a schematic flow diagram illustrating some aspects of the invention.

It is a primary object of this invention to provide a method and a system that will enable the teacher to select one of an unusually large number of programs for her purposes in teaching students, yet obviate the disadvantages of the prior art methods and devices.

It is also an object of this invention to provide a relatively economical system that may be operated in different programs effecting different modes and an unusually large number of problem-correct answer sequences; yet that obviates the disadvantages of the prior art devices.

Other objects and particular features and aspects of the invention will become apparent from the descriptive matter hereinafter, given with respect to the drawings enumerated hereinbefore.

The following broad outline of steps followed in a method of operation affords insight to the interrelationship between some of the explicitly recited broad aspects of the invention and is helpful in understanding the system described hereinafter. The teacher selects a program from a teacher's manual. The program delineates the number of answers for each problem, the problem-correct answer sequence and the mode of operation. The mode of operation is either in the tutor mode; the test and grade mode; or the tutor, test and grade mode.

The teacher then prepares a series of specific problems arranged such that the problem-correct answer sequence is in accordance with the program selected. Then she sets a programing network to effect the program and define whether a student selects and registers a correct answer or an incorrect answer for each of the problems.

The student then selects and registers his selected answers, sequentially for the problems, through the programing network. The student is advised and is guided through the problems in accordance with one of the modes afforded by the program set into the programing network. In the tutor mode, the student is advised that his answer is incorrect until he selects and registers the correct answer, then he is advanced to the next problem. In the test and grade mode, the student is advised that his answer is correct or incorrect, the number of correct answers is counted, and the student is advanced to the next problem. In the tutor, test and grade mode, the student is advised that his first answer is correct and if his first answer to a given problem is correct the correct answer is counted and the student is advanced to the next problem; however, if the student's answer is not correct the first time, the student is advised each time his answer in incorrect until he selects and registers the correct answer and then the student is advanced to the next problem without giving credit for the correct answer finally selected and registered.

To facilitate setting the program into the programing network, the teacher has a separable setting means which is appropriately marked, as by letters of the alphabet, such that the programing network can be readily set, yet when the setting means is removed the designation of the program is unknown to the student. Because of the large number of program options available to the teacher, the student is, for all practical purposes, prohibited from learning the programing network arrangement instead of learning the subject matter. The separable setting means complicates any attempt the student might make to correlate programs in the programing network with a particular problem-correct answer sequence.

FIG. 1 illustrates schematically the method of instruction from the time the student sees the educational material containing the problems, each with a plurality of answers therefor. The student starts with problem number 1 for which he selects and registers an answer. If the selected answer is correct, the programming network affords a route 11 which shows the student his answer is correct by a correct apprising means; such as, a green light. In addition, via a mode selector the student is credited with a correct answer in modes other than the tutor mode and is advanced to the next problem in all modes, including the tutor mode.

If, on the other hand, the answer selected by the student is incorrect, the programming network affords a second route 13 by which the student is advised that his answer is incorrect by incorrect apprising means; such as, a red light. Further proceeding is determined by the mode into which the mode selector has been placed.

If in the test and grade mode, the student is advanced to the next problem even though he answered incorrectly.

In the tutor mode, the student is not advanced to the next problem but is required to again select and register an answer for the same problem until he achieves a correct answer. In this way, he is compelled to learn the correct answer, even if by trial and error.

In the tutor, test and grade mode, a memory is activated by the incorrect answer. The memory prevents the student from receiving credit for a correct answer later selected and registered for the same problem. The student selects and registers another answer to the problem. On this and subsequent selections of an incorrect answer the student is advised that his answer is incorrect by incorrect apprising means. In this event, he again selects and registers another answer. Thus, the student is forced to select and register the correct answer before he can proceed to the next problem. When finally a correct answer is selected and registered, the student is so advised by correct apprising means and is advanced to the next problem. In the process of advancing to the next problem, the memory is deactivated to allow receiving credit for a correct answer on the first answer selected and registered for subsequent problems. In the tutor, test and grade mode, the student learns the correct answer before being advanced to the next problem and the teacher learns how well the student knows the subject material by the number of correct answers selected the first time by the student.

Figure 2:
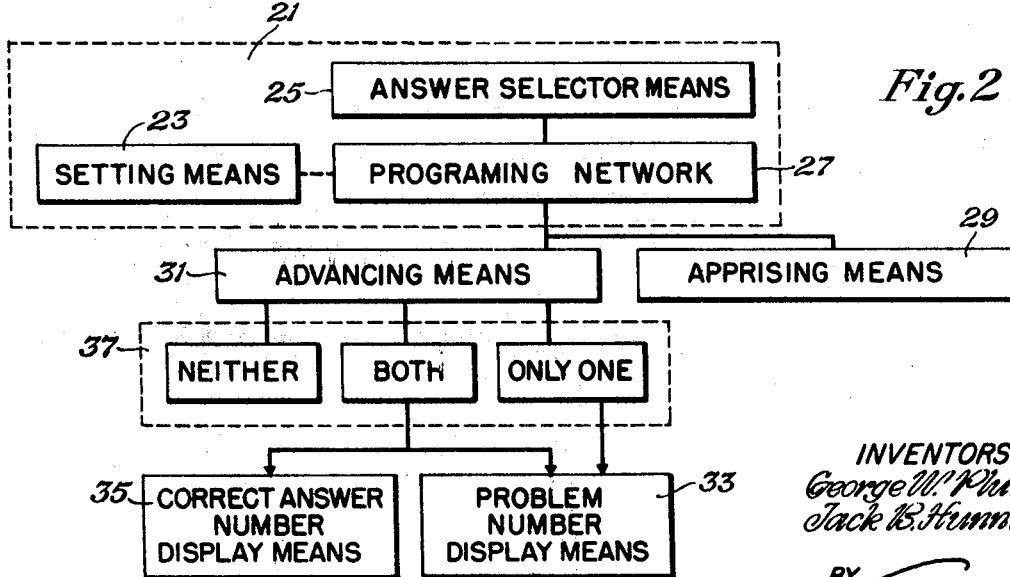
FIG. 2 is a block diagram illustrating the elements in one embodiment of the invention.

FIG. 2 illustrates in block format a system enabling carrying out the methods described hereinbefore. Therein, encoding means 21 includes a separable setting means 23; an answer selector means 25 and a programming network 27. As indicated hereinbefore, the programming network, in conjunction with the answer selector means selects the number of answers for each problem, selects one of the many problem-correct answer sequences available, selects a mode of operation, and defines whether or not an answer selected and registered on the answer selector means is correct. In addition, apprising means 29 advises the student whether or not the answer selected was correct.

Problem number display means 33 is provided for advising the student of the number of the problem which the student is answering. Correct answer number display means 35 is also provided for advising the student the cumulative total of correct answers given on the first answer to given problems.

Advancing means 31 includes discriminating means 37, responsive to an information signal from programming network 27 to effect selective operation of advancing means 31 for advancing either problem number display means 33 alone, both problem number display means 33 and correct answer display means 35; or neither problem number display means 33 nor correct answer number display means 35.

If desired, separable setting means 23 may be omitted and programing network 27 readily programed otherwise, as by an inexpensive element; such as, a paper tape or paper disc; keyed to the program selected.

FIG. 3 illustrates an exterior plan view of a cabinet suitable for housing a device useful in one embodiment of the invention. As indicated hereinbefore, the student will have a paper for tutoring, testing, or both; with problem, or question, numbers and with multiple choice answers for each problem. For example, each problem may have up to six selections from which to choose a correct answer. A selector dial 39 is provided for selection of the answer to the problem whose number is displayed in problem number display window 41. Push-to-score button 43 is provided for registration of the selected answer. Correct lamp 45, ordinarily green, and incorrect lamp 47, ordinarily red, are connected such that one or the other will be energized, or lit, after registration of a selected answer by depression of button 43. Correct answer display window 49 is provided to reveal the cumulative total of correct answers registered on the first selection and registration for each given problem.

Figure 5:
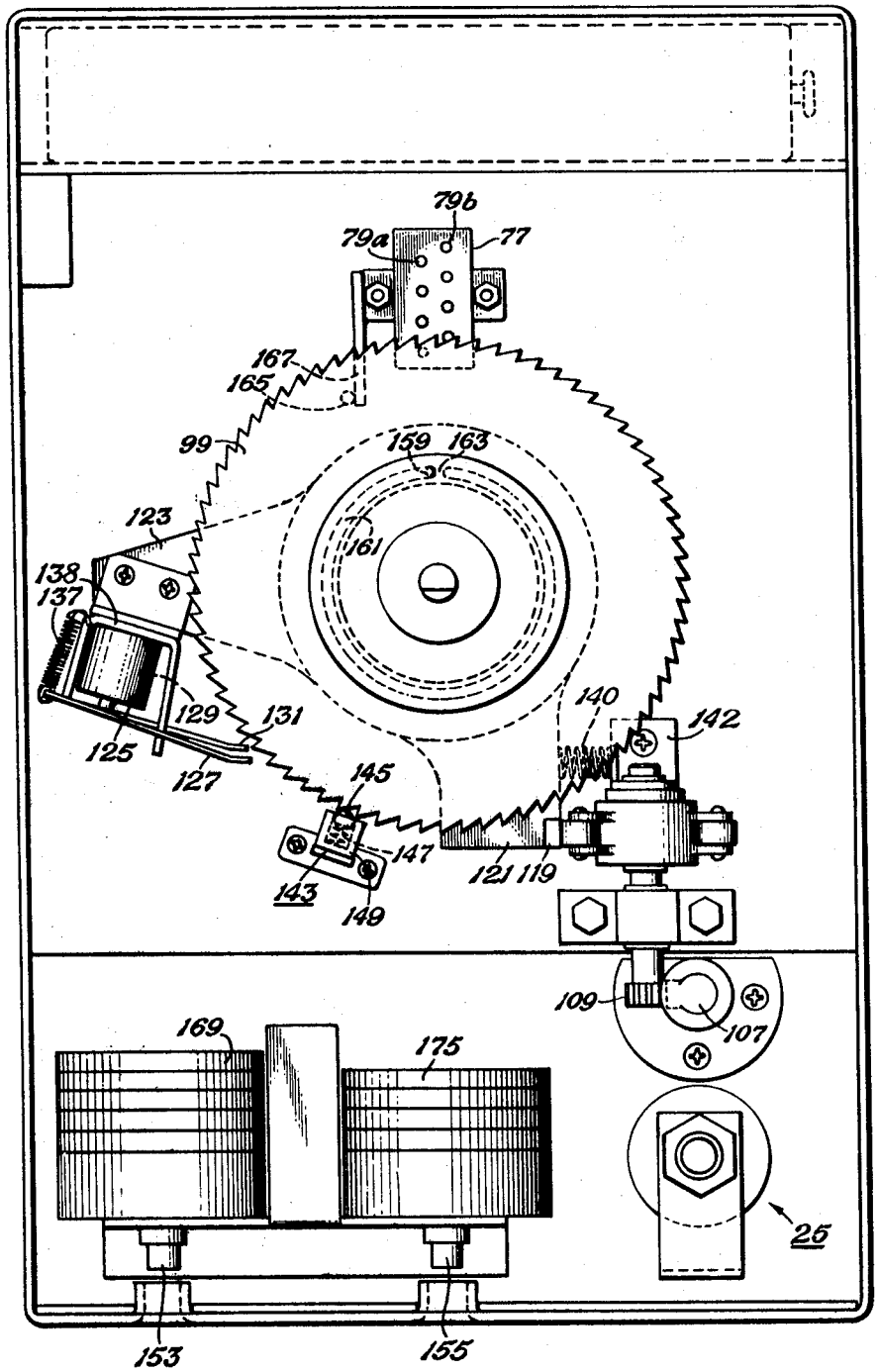
FIG. 5 is a plan view of the embodiment illustrated in FIG. 4.

FIGS. 4 and 5 illustrate, respectively, side and plan views of one embodiment of the invention, emphasizing primarily the mechanical aspects of that embodiment. FIG. 5 is presented primarily to clarify aspects not apparent in FIG. 4. Consequently, obvious components such as the discs are not shown therein. Referring to FIGS. 4 and 5, program disc 51 is rigidly but removably fastened onto shaft 53; as by knurled nut 54. Shaft 53 is fixed to bearing means 55 as by screw 56 and it is rotatably supported by bearing means 55, mounted on frame 57.

Program disc 51 is a specific illustration of a program means. The program means should be connected with the problem gear so as to be advanced each time the problem gear is advanced. The program means should have many segments in a first determinable condition and many segments in a second determinable condition. The segments should be disposed in a predetermined arrangement on the program means. In order for the program means position to have significance, an interpreting head is provided which includes a plurality of monitoring means, one each for a predetermined section of the predetermined arrangement. The monitoring means then sense whether a segment in the first determinable condition or a segment in the second determinable condition is contiguous to the respective monitoring means for any given position of the program means. The program means may comprise any means; such as, magnetic tape having segments of magnetically oriented domains, or paper tape having apertures therethrough. Program disc 51, however, illustrates a preferred embodiment of a program means.

Figure 6:
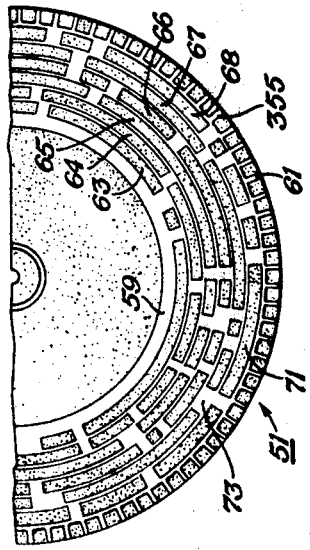
FIG. 6 is a partial plan view of a program disc employed in one embodiment of the invention illustrated in FIGS. 4 and 5.

Program disc 51 is an important part of programing network 27 and is illustrated in plan view in FIG. 6. Program disc 51 has eight tracks, including common terminal track 59, and pulsing track 61. Program disc 51 has six intermediate tracks 63–68. Intermediate tracks 63–68 contain insulating segments 71 and conducting segments 73. All conducting segments 73 are connected together and connected with common terminal track 59 to provide a closed circuit if a correct answer is selected, as described hereinafter in more detail.

Interpreting head 77, FIG. 4, has, as monitoring means, fingers, or brushes, 79, one for each track on program disc 51, for sensing whether an insulating segment 71 or a conducting segment 73 is under and contiguous to the respective brushes 79. As illustrated in FIG. 5 the brushes are arranged in two rows which are offset by a distance equivalent to two radial rows on program disc 51. Expressed otherwise, brushes 79a monitor tracks 59, 64, 66 and 68 whereas brushes 79b monitor tracks 63, 65, 67 and 61. This two row arrangement facilitates emplacement of brushes 79 in interpreting head 77.

Toothed problem gear 87, FIG. 4, is connected to shaft 53 as by screw 89. Since shaft 53 is rotatable in both directions, problem gear 87 is rotatable in both directions. Integral with shaft 53 is hub 91 and keyshaft 93. Problem number display disc 95 is connected to hub 91 as by screws 97. Thus problem number display disc 95, keyshaft 93, hub 91, toothed problem gear 87, bearing means 55, shaft 53 and program disc 51 rotate in unison.

Toothed correct answer gear 99 is journaled to rotate independently of shaft 53 but around the same axis. Correct answer gear 99 is rotatable in either direction about the axis of shaft 53. Correct answer display disc 101 is connected with correct answer gear 99 as by screws 103. Thus, toothed correct answer gear 99 and correct answer display disc 101 rotate in unison about, but independently of, shaft 53.

Answer selector dial 39 provides electrical continuity to a designated terminal as described in more detail hereinafter in connection with the encoding means and the programming network.

Push-to-score button 43 is connected with rack 107 which in turn engages pinion 109. Pinion 109 is connected via shaft 111 and ratchet means 113 with cam means 115.

Cam means 115 serves as a bolt moving means and comprises a rotatable member with at least one eccentric protrusion to contact the bolt means and move the bolt means in a direction opposite to the direction in which the bolt means is biased. The eccentric protrusion on the rotatable member must be freely rotatable so as to be displaced in front of the bolt means when it is returned by the bias in the one direction to the stop position. Specifically, cam means 115 has, as its eccentric portion, spider arms spaced at 120° with respect to each other and containing at their respective terminal ends a rotatable wheel 117. Cam means 115 on shaft 111 is supported on frame 57 by mounting bracket 118.

Two pressure wheels 117 bear simultaneously against upright member 119 of bolt means 121 in the stop position. Bolt means 121 is journaled to rotate freely about and independently of shaft 53 and both problem gear 87 and correct answer gear 99. Bolt means 121 carries, integrally therewith, arm 123, FIG. 5. Mounted on arm 123 are problem and correct answer gear engaging means and problem gear engaging means. Problem and correct answer gear engaging means comprises solenoid 125 and pawl 127. Problem gear engaging means comprises solenoid 129 and pawl 131.

The arrangement is illustrated more clearly in FIG. 7. As illustrated pawl 127 extends across and engages both teeth 133 on correct answer gear 99 and teeth 135 on problem gear 87. Pawl 127 is pulled downward to engage the respective teeth by an appropriate signal; such as, an electrical impulse to solenoid 125. Spring means 137 is connected across a fulcrum between pawl 127 and base 138 to bias outwardly pawl 127 so as to disengage the teeth upon cessation of the appropriate signal.

On the other hand, pawl 131 engages only teeth 135 on problem gear 87 when an appropriate second signal; such as, another electrical pulse; is sent to solenoid 129. In like manner, a second spring means 139 is connected between pawl 131 and base 138 to disengage pawl 131 from teeth 135 upon cessation of the second signal.

For normal advancement, bolt means 121 is biased in a counterclockwise direction by a spring means 140. Spring means 140 biases bolt means 121 to return to its stop position. Spring means 140 may be attached at any appropriate stationary point; such as, second mounting bracket 142 and directly to the bolt of bolt means 121.

To effect proper positioning of problem gear 87 and correct answer gear 99, a centering assembly 143 is provided for each of the gears. Each centering assembly comprises centering cylinders 145 for engaging the detent between adjacent teeth on the respective gears. Centering cylinders 145 are biased toward the respective gears by spring 147 and removable socket 149. Socket 149 is removably connected with frame 57.

Bolt means 121 is advanced a predetermined distance such that problem and answer gear engaging means or the problem engaging means will engage the next succeeding tooth on the problem gear or on the correct answer gear, if an appropriate signal or an appropriate second signal is sent. In this way, the gears are advanced the number of degrees equivalent to a tooth thereon.

The number of teeth on the problem gear and the correct answer gear should be at least equal to the number of problems with which the system will be employed. Providing room for 100 problems is more than adequate since a student operating at the limit of his knowledge cannot answer more problems than this in a normal study period. For 100 problems, construction and assembly is facilitated if there is provided at least 102 teeth on the problem gear and 102 teeth on the correct answer gear to allow placement of pins and the like on the respective gears. With such construction advancing a distance equivalent to one tooth advances the respective gears and discs approximately 3.5°.

Consequently, the program disc is advanced approximately 3.5° for each advancement of the problem gear. There are over 800 stations arranged in at least 102 radial rows of segments around the plurality of tracks on the program disc to facilitate handling the 100 problems.

The setting means, illustrated in FIG. 8, is a separable teacher's key. It has an aperture 151 conforming to keyway shaft 93 and to shafts 153 and 155 of switches in the programming network, described hereinafter, such that it is positionable thereon in only one position. Around the periphery, setting means 23 has indicia; such as, letters as illustrated in FIG. 9; to facilitate encoding a program into the encoding means. Specifically, when fitted on shaft 153, setting means 23 sets a code, or a part of a program, when a letter is aligned with an index 157 to indicate that shaft 153 has positioned the switch in a unique way, such that a unique plurality of conductive paths exist through the switch. This is illustrated and described further in connection with FIG. 10 hereinafter. When fitted onto keyway shaft 93 setting means 23 is operable by the teacher to reset the program into the system by rotating the problem gear clockwise, or a direction opposite to that for normal advancement, to a starting position. Since problem gear 87 will always have advanced at least as far as correct answer gear 99, pin 159 protruding from problem gear 87 traverses groove 161 in normal advancement but picks up block 163 across groove 161 to simultaneously return correct answer gear to the starting position when the problem gear 87 is returned to the starting position. Since the respective display discs 95 and 101 for problem number and correct answer number, move in unison respectively with problem gear 87 and correct answer gear 99, they are simultaneously returned to the starting position; as is program disc 51. A positive stop is provided at the starting position by large pin 165 on correct answer gear 99 engaging limit bar 167 attached to frame 57.

Figure 10:
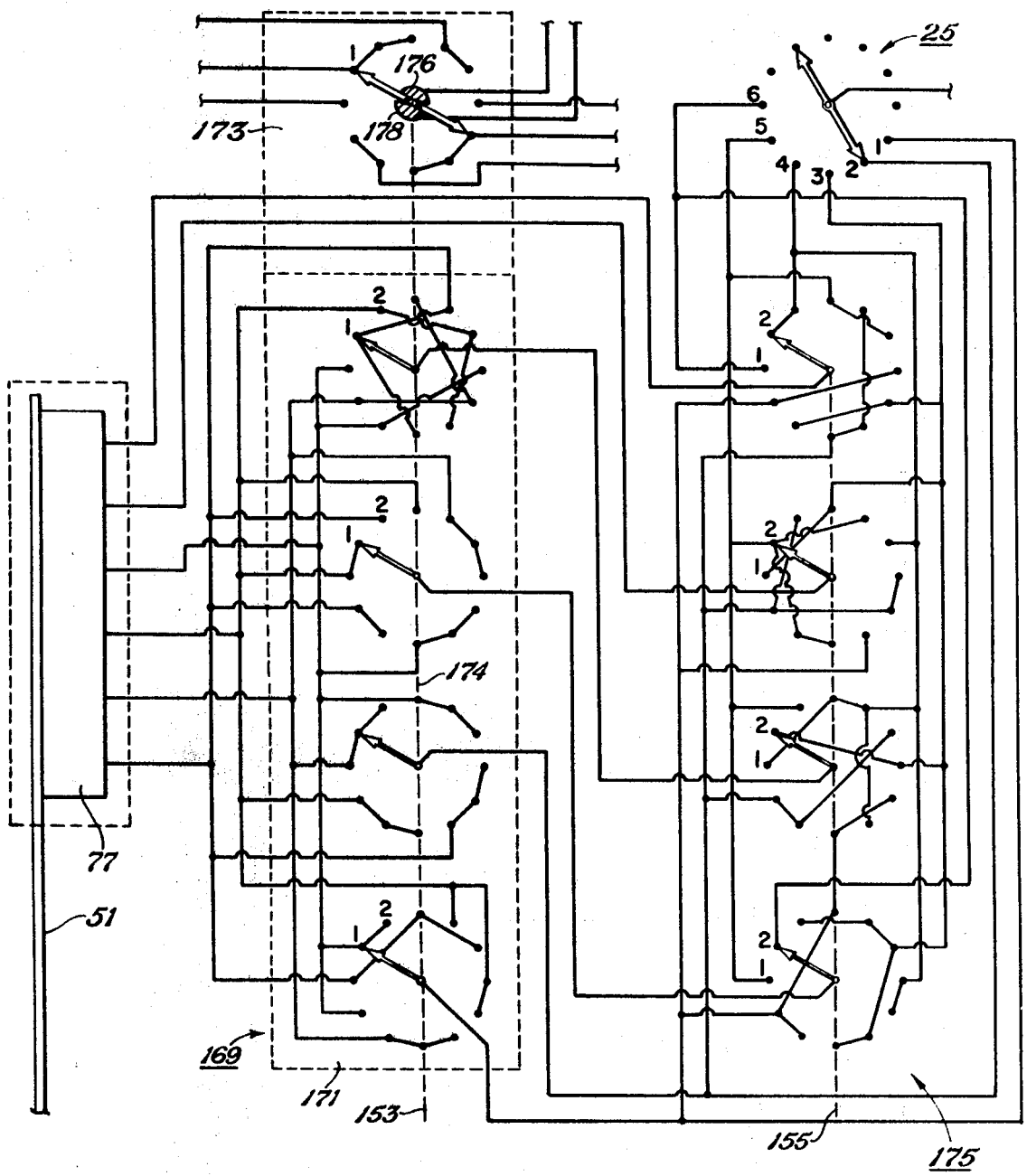
FIG. 10 is a schematic illustration of an encoding means showing the programing network employed in one embodiment of the invention.

To increase the number of options available from a single disc with its in excess of 800 stations, encoding means 21 has in its programming network 27 means providing a plurality of conductive paths between the answer selector means 25 and the program disc 51. The means providing a plurality of the conductive paths includes at least one scrambling switch. Preferably, however, it includes a plurality of scrambling switches; such as, a plurality of multi-deck wafer switches. FIG. 10 illustrates schematically one embodiment of the invention. Therein a plurality of multi-deck wafer switches is provided between interpreting head 77, adjacent program disc 51, and answer selector means 25, operated by answer selector dial 39, FIG. 3. First multi-deck wafer switch 169 includes scrambling switch 171 and mode selector means 173. Mode selector means 173 provides separate switching action as delineated hereinafter and is electrically isolated from but mechanically connected with the remaining decks in scrambling switch 171, as indicated by dashed line 174. Scrambling switch 171 reorders the conductive paths between the segments of the program disc via interpreting head 77 and answer selector means 25. Second multi-deck switch 175 provides further scrambling, or reordering, of conductive paths and allows selection of the number of answers that are possible for each problem in the material to be given to the student. Second multi-deck switch 175 is also referred to as scrambling and option switch 175.

The contacts and wiper arms on the multi-deck switches are interconnected to afford a scrambling sequence that; in conjunction with the interpreting head 77 and program disc 51, and answer selector 25; affords a two dimensional programming matrix such as illustrated in Table I. There are twelve contacts on each deck of the switches illustrated as scrambling switch 171 and scrambling and option switch 175. The contacts are arranged clockwise, the position of contact number 1 being indicated for each wafer. Each contact is equated to a letter code, illustrated on setting means 23, FIG. 9. For example, position 1 is equivalent to aligning the letter A with the index on the cabinet. The teacher readily encodes a given program through the use of setting means 23. Switch 169 is turned to a desired letter of the alphabet to position the wiper arms on the corresponding position in accord with the row shown in the programing matrix of Table I. Specifically, the teacher's key is inserted onto shaft 153 of switch 169 and rotated until a given letter aligns with index 157 on cabinet 57. If the letter C is aligned therewith then row C; for example, the third one down in programing matrix of Table I; is selected. Similarly, the teacher's key may be inserted on shaft 155 of scrambling and option switch 175 to rotate it to a given leter to align with a particular column number. For example, if E, the fifth column, is selected, this tells the teacher that the test may have 5 options, or answers, for each problem; and that the student will be in the tutor, test and grade mode. A separate sheet, the teacher's manual, specifies the problem-correct answer sequence; that is, the location of the correct answer for each given problem.

TABLE I.—PROGRAMING MATRIX

| No. Answers | | | | | | | | | | | | Mode |
|---|---|---|---|---|---|---|---|---|---|---|---|---|
| 6 | | 5 | | 4 | | | | 3 | | 2 | | |
| AA | AB | AC | AD | AE | AF | AG | AH | AJ | AK | AL | AM | Tutor, test and grade. |
| BA | BB | BC | BD | BE | BF | BG | BH | BJ | BK | BL | BM | |
| CA | CB | CC | CD | CE | CF | CG | CH | CJ | CK | CL | CM | |
| DA | DB | DC | DD | DE | CF | DG | DH | DJ | DK | DL | DM | Test and grade. |
| EA | EB | EC | ED | EE | EF | EG | EH | EJ | EK | EL | EM | |
| FA | FB | FC | FD | FE | FF | FG | FH | FJ | FK | FL | FM | Tutor. |
| GF | GB | DC | GD | GE | GF | GG | GH | GJ | GK | GL | GM | Tutor, test and grade. |
| HA | HB | HC | HD | HE | HF | HG | HH | HJ | HK | HL | HM | |
| JA | JB | JC | JD | JE | JF | JH | JH | JJ | JK | JL | JM | |
| KA | KB | KC | KD | KE | KF | KG | KH | KJ | KK | KL | KM | Test and grade. |
| LA | LB | LC | LD | LE | LF | LG | LH | LJ | LK | LL | LM | |
| MA | MB | MC | MD | ME | MF | MG | MH | MJ | MK | ML | MM | Tutor. |

As can be seen in FIG. 10 the output of the first or lower four brushes in interpreting head 77 are connected to the fixed contacts of scrambling switch 171 in such a manner that at each position the output sequence is unique. The outputs of the third and fourth decks of scrambling switch 171 and the output of the fifth and sixth brushes of the interpreting head are connected to the wiper arms of the scrambling and option switch 175. The wiper arms of the scrambling and option switch 175 are wired such that each position of this switch gives a unique output sequence. The output leads of the scrambling and option switch 175 are connected to the answer selector means at positions 3, 4, 5 and 6. Positions 1 and 2 of the answer selector means are connected directly to the wiper arms of scrambling switch 171 as illustrated.

Mode selector means 173 may be represented schematically as illustrated in FIG. 10 and described in connection therewith. Any scrambling sequence can be provided. The scrambling sequence illustrated provides a programing matrix such as shown in Table I. Mode selector means 173 of first multi-deck wafer switch 169 employs a wiper arm that has two conductive ends insulated from each other and 180° apart; and dual central terminals. Thus, when the conductive end portions are electrically connected with two of the fixed, or peripheral contacts, they also are electrically connected to the respective central terminals to afford two complete electrical paths. That is, one conductive end of the wiper arm connects contacts 1, 2 or 3 with first central terminal 176 while simultaneously the outer conductive end of the wiper arm connects terminals 7, 8 or 9 to second central terminal 178. Either of these positions effect the tutor, test and grade mode and is set when switch 169 has indicia A, B, C, G, H or J aligned with the index. This is equivalent to having the mode switch in contact position 2 in FIG. 10. Similarly, when the wiper arms point to contacts 4 and 10, or 5 and 11, equivalent to letters D, E, K or L, the mode selector means is set in the test and grade mode. This is equivalent to contact position 3, FIG. 10. Similarly, when the wiper arms point to the contacts 6 and 12, equivalent to letter designations G and M, the mode selector means is set in the tutor mode. This is equivalent to contact position 1, FIG. 10.

Table II summarizes the number of programs that are available in the respective modes and that offers a given number of possible choices for answer. For example, there are only twelve programs affording six answers per problem in the tutor, test and grade mode whereas there are twenty-four programs available affording only five answers per problem.

TABLE II.—SUMMARY

| Mode | No. answers | | | | |
|---|---|---|---|---|---|
| | 6 | 5 | 4 | 3 | 2 |
| Tutor, test and grade | 12 | 24 | 18 | 12 | 6 |
| Test and grade | 8 | 16 | 12 | 8 | 4 |
| Tutor | 4 | 8 | 6 | 4 | 2 |

Thus, it can be seen from FIG. 10 that electrical continuity will exist through at least one path when answer selector means 25 has its wiper arm positioned onto the contact having a conductive path and a conducting segment 73 on program disc 51 contiguous its brush in interpreting head 77, in accordance with a problem-correct answer sequence designated by the encoding means. Such continuity, showing a correct answer, is designated by a closed AB switch in the circuit schematic diagram of FIG. 12, discussed hereinafter.

Figure 11:
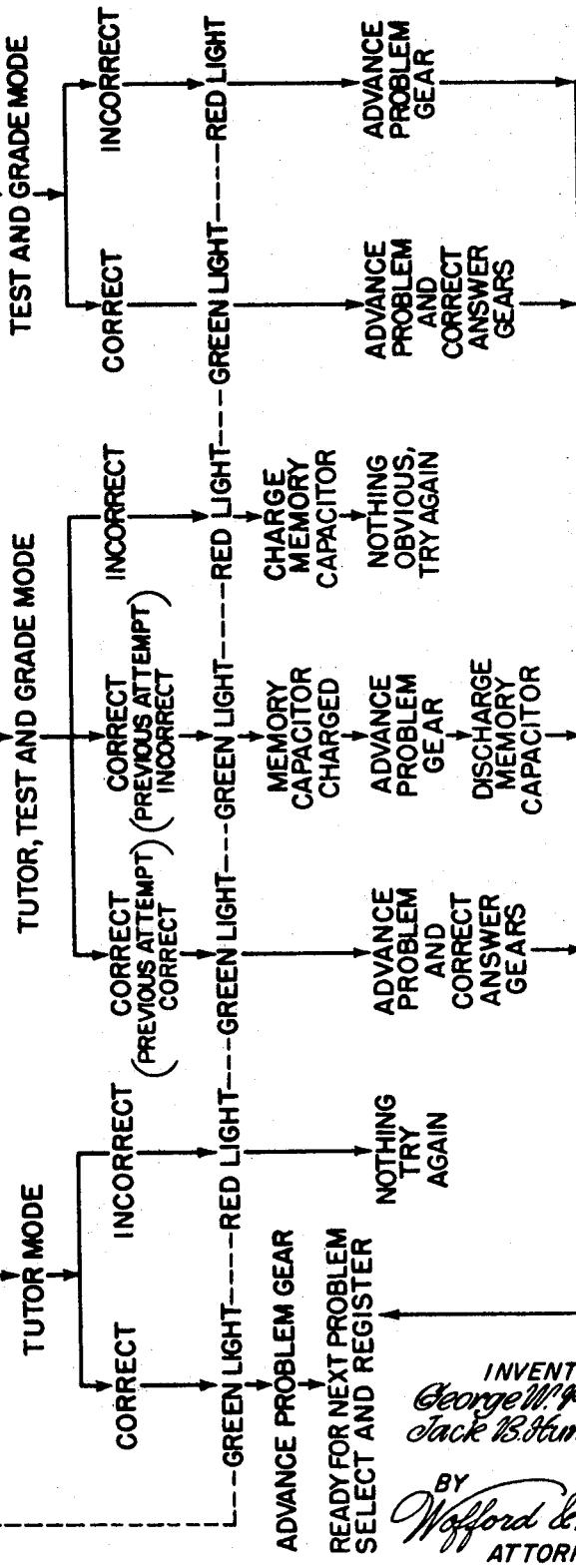
FIG. 11 is a schematic flow diagram illustrating operation of one embodiment of the invention.
Figure 12:
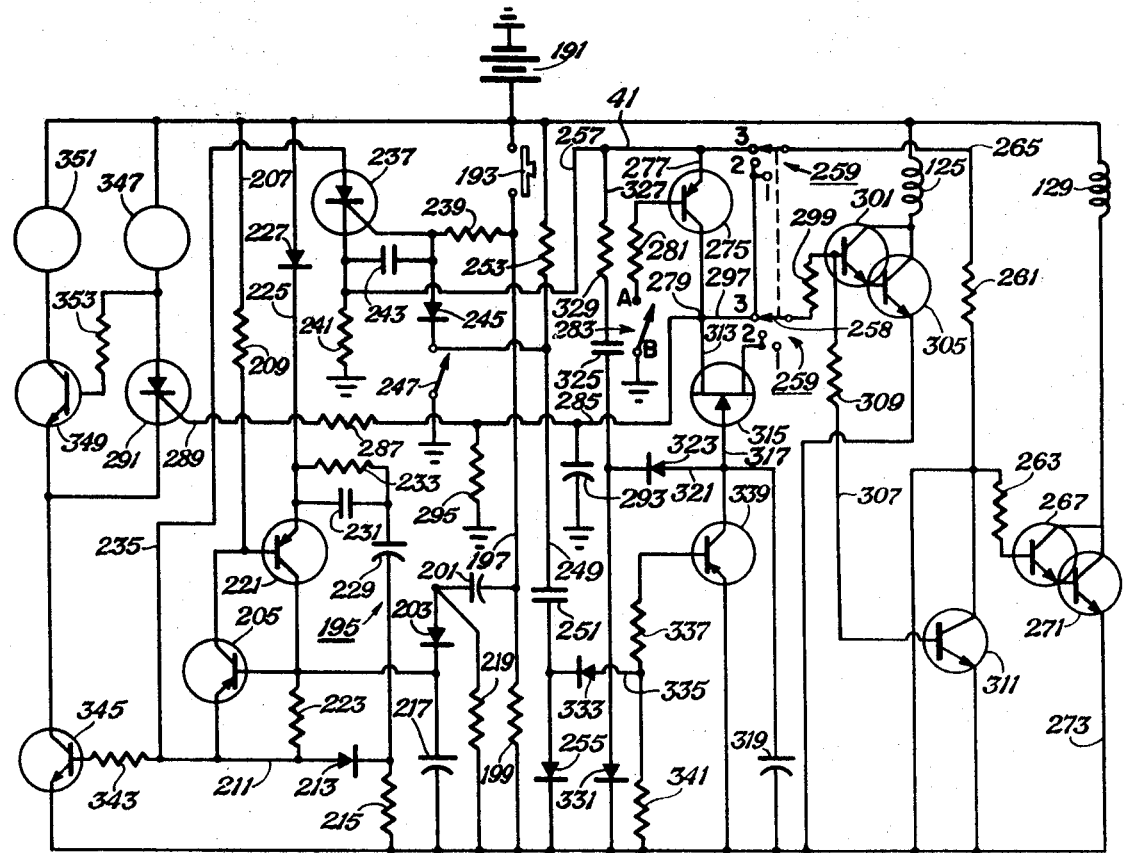
FIG. 12 is a circuit schematic diagram used in one embodiment of the invention.

FIG. 11 illustrates by a schematic flow diagram operation of one embodiment of the invention and demonstrates the requirements that the electrical components shown in FIG. 12 must satisfy. As with FIG. 1, FIG. 11 illustrates the sequence of events after the student has the material containing the problems and answers and is ready to operate the system. The student selects and registers his answer. The advancing means advances bolt means which closes a micro-switch. Closing of the micro-switch activates a lamp timing circuit and an engaging means timing circuit, called solenoid timing circuit. Through the programing network, as discussed hereinbefore, the correctness or the incorrectness of the answer is sensed, and through the mode selector switch in the programing network, the mode of operation is chosen. If the tutor mode has been selected then tutor route 181 is afforded by programing network. If the answer is correct, a green lamp is energized by lamp timing circuit and remains lighted for a timed interval, the length of which is predetermined by the lamp timing circuit.

The timed interval should be long enough for the light to be detected by the human eye but short enough to prevent unnecessary drain on the power source. It has been found that about 120 milliseconds is a very nearly ideal time since the light is plainly visible within this time but very little power is drawn when the lamp is energized for only 120 milliseconds.

Simultaneously, the problem gear is advanced and the student is ready for the next problem. The shortened designation "Advance Problem Gear" connotes the happening of several things. Specifically, the appropriate signal is sent to energize the problem solenoid and engage the pawl in teeth on the problem gear. Thus, as the bolt means is returned to the stop position, the problem gear, the program disc and the problem number display disc are advanced. The advancing of the program disc closes a pulsing switch means; thus, resetting the solenoid timing circuit, turning off the solenoid and stopping the correct answer signal supplied to a terminal.

If the student's answer is incorrect, the student is given a timed red light and nothing more. Accordingly, the student selects and registers a second answer to the same problem, if incorrect he gets a red light and nothing more. He repeats this process until he has selected the correct answer and is thus forced to learn the correct answer. No score is kept in the tutor mode.

If the test and grade mode has been selected, test and grade route 183 is designated by the programing network. If the student's answer is correct he is given a timed green light; both the problem and correct answer gears are advanced; and the student is ready for the next problem. The shortened designation "Advance Problem and Correct Answer Gears" connotes the happening of several things. Specifically, an appropriate signal is sent to energize the problem and correct answer solenoid, engage the pawl in the teeth on both gears; and advance the problem and the correct answer gears. Advancement of these gears also advances the program disc and the problem and correct answer number display discs. Advancing of the program disc closes pulsing switch means and resets solenoid timing circuit with attendant turning off of the solenoid and stopping the correct answer signal.

If the student's answer is incorrect, he is given a timed red light; the problem gear is advanced and the student is ready for the next problem. Advancing the problem gear effects all of the results connoted hereinbefore. In the test and grade mode, the student is advanced to the next problem whether or not his answer is correct.

If the tutor, test and grade mode has been selected, the programing network designates tutor, test and grade route 185. If the student's first selected answer is correct, designated by "previous attempt correct," he is given a timed green light and both the problem gear and the correct answer gear are advanced, with all that cannotes. One other action effected by advancing the program disc is significant in the tutor, test and grade mode. Advancing the program disc also closes pulsing switch means, thereby deactivating a memory means illustrated as discharging a memory capacitor.

If the student's answer is incorrect he is given a timed red light. In addition, the open AB switch effected by his incorrect answer activates a memory means illustrated as charging the memory capacitor such that he will not receive credit for any subsequent correct answer on the same problem. The student, however, is given no further indication so he should try again. If again an incorrect answer is chosen, the student is given a timed red light but no further indication and the capacitor remains charged. When finally the student selects a correct answer, designated by "previous attempt incorrect," he is given a timed green light but the charged memory capacitor will prevent the engagement of the problem and correct answer solenoid. Consequently, only the problem solenoid is engaged to advance only the problem gear, with all that connotes. One other action effected by advancing the problem gear is significant in the tutor, test and grade mode. Advancing the program disc closes the pulsing switch means thereby deactivating the memory means, illustrated as discharging the memory capacitor. Accordingly, the student is ready to select and register an answer for the next problem.

Encoding means 21 includes a discriminating means 37, responsive to mode selector means and correct answer selector means in programing network 27 and selectively connectable with the problem and correct answer gear engaging means and with the problem gear engaging means for generating and conveying an appropriate signal to the problem and correct answer gear engaging means and for generating and conveying an appropriate second signal to the problem gear engaging means. The discriminating means includes an enaging means timing circuit activatable upon rotation of the bolt means and selectively electrically connectable via the mode selector means with the problem gear engaging means in the test and grade mode. The discriminating means also includes a switch means for supplying a correct answer signal to a terminal. The switch means is also termed "correct answers switch means." Correct answer switch means is electrically connected with the engaging means timing circuit; with the programing network and the correct answer selector; and with the apprising means for conducting power from the engaging means timing circuit to the apprising means when a completed electrical connection exists through the programing network and the correct answer selector. The switch means is selectively electrically connectable via the mode selector means with the problem gear engaging means in the tutor mode and in the tutor, test and grade mode; and is selectively electrically connectable via the mode selector means to the problem and correct answer gear engaging means in the test and grade mode. The discriminating means also includes a memory means electrically connected in series with the switch means for preventing the conveying of the appropriate signal to the problem and correct answer gear engaging means when a completed electrical connection is obtained through the programing network and the correct answer selector means on an attempt other than the first attempt to answer a given problem when the mode selector is in the tutor, test and grade mode.

Referring to FIG. 12, a power source 191 has one terminal connected directly to electronic elements in the circuit without a power switch that could be left on to drain power source 191, and has the other terminal connected to ground, or common. In one embodiment power source 191 is a battery having a potential of about nine volts.

Microswitch 193 is adjacent bolt means 121 so as to be physically actuatable to the closed position upon advancing of bolt means 121 during selection and registration of an answer.

Microswitch 193 is connected so as to activate lamp timing circuit 195. Specifically, microswitch 193 is connected to ground via conductor 197 through resistor 199. Capacitor 201 is pulsed and the pulse is transmitted by diode 203 to the base of transistor 205. Power source 191, conductor 207, resistor 209, transistor 205, conductor 211, diode 213, resistor 215, and ground, or common, are connected in series. Capacitor 217 serves as a filter in conjunction with diode 203 to minimize transient signals. Resistor 219 is selected to effect a narrow triggering pulse from capacitor 201. Conductor 207 is connected to the base of transistor 221. Power source 191 is connected by way of transistor 221 to bias the base of transistor 205 and via resistor 223 with conductor 211. Conductor 225 and diode 227 serve as the conducting means by which one side of transistor 221 is connected with power source 191. Timing capacitor 229 is connected to the juncture of diode 213 and resistor 215, and to conductor 225. Capacitor 231 is a commutation capacitor to increase initial holding current to counteract any remains of the triggering pulse. The resistance-capacitance product (RC) of timing capacitor 229 and resistor 233 determines the time constant, or the interval of time a lamp timing signal is impressed onto lamp timing circuit 195. Specifically, the perturbation of the charge on capacitor 229 effected by the triggering pulse and the regenerative switching action of transistors 205 and 221 effects a lamp timing signal until steady state, or equilibrium, conditions are again achieved. For example, the juncture of capacitor 229 and resistor 233 may be raised from an equilibrium voltage of about 9 volts to an unsteady state voltage of about 18 volts and a lamp timing signal effected until it is discharged back to the equilibrium voltage.

Conduction of transistor 205 supplies power via conductor 235 to silicon controlled rectifier (SCR) 237. SCR 237 is connected via resistor 239 with conductor 197 and microswitch 193. SCR 237 is also connected with ground via resistor 241. Capacitor 243 serves to minimize susceptibility to transient signals. The juncture of the firing lead for SCR 237 and resistor 239 is also connected to ground via diode 245 and a pulsing switch means 247 for turning off SCR 237. Pulsing switch means 247 is connected to power source 191 via conductor 249 and resistor 253 for pulsing capacitor 251. Conductor 249 also serially connects power source 191, resistor 253, capacitor 251, diode 255, and ground.

Pulsing switch means 247 is operatively closed by pulsing contacts 355 on program disc 51, FIG. 6, just after the next tooth on the problem gear passes the centering assembly on forward advancement, to effect stopping the solenoid timing signal and resetting the memory means. Pulsing switch means is operatively closed by rotation of the problem gear and, hence, the program disc, in either direction. Thus, the memory means is also discharged, or reset, each time the teacher's key is employed to rotate the respective gears and discs to the starting position for a new class.

SCR 237 and conductor 257 are included in an engaging means timing circuit, shown here as solenoid timing circuit. The engaging means timing circuit thus is activatable upon rotation of the bolt means and is selectively connectable via the mode selector means with problem gear engaging means in the test and grade mode. Specifically, solenoid timing circuit conductor 257 is connected via mode switch 259 in contact position number 3 and resistors 261, 263 and conductor 265 with the base of transistor 267. Transistor 267 is connected to the juncture of problem solenoid 129, serving as the problem gear engaging means, and transistor 271 and to the base of transistor 271. Power source 191, problem solenoid 129, transistor 271, conductor 273 and ground are connected in series. Thus, transistor 271 forms a switch means for energizing problem solenoid 129, and transistor 267 forms an actuating means for turning on transistor 271.

A correct answer switch means, illustrated by transistor 275, is connected in series with solenoid timing circuit conductor 257 via conductor 277 for effecting a correct answer signal. Specifically, when transistor 275 conducts, it supplies power from solenoid timing circuit conductor 257 to terminal 279. The base of transistor 275 is connected to ground via resistor 281, and the programing network and correct answer selector means, all illustrated as AB switch 283. Problems are created by the additive resistances in the programing network and correct answer selector, serving as actuating means for correct answer switch means. Accordingly, the switch means employed must have a gain factor sufficient to alleviate the problems attending the additive resistances. Preferably the switch means should have a gain factor greater than 10. It has been found advantageous to employ a transistor having a gain factor of about 100. Switch means having even higher gain factors can be employed. The correct answer switch means is electrically connected with the apprising means for conducting power from the engaging means timing circuit to the apprising means when a completed electrical connection exists through the programing network and the answer selector means. Specifically, terminal 279 is connected via conductor 285 and resistor 287 with the firing lead 289 of SCR 291. Capacitor 293 and resistor 295 form a filter network to minimize transient signals. Resistor 295 also serves as a load to ground for transistor 275.

The correct answer switch means is also selectively electrically connectable via the mode selector means with the problem gear engaging means in the tutor mode and in the tutor, test and grade mode, and selectively electrically connectable via the mode selector means to the problem and correct answer gear engaging means in the test and grade mode. Specifically, terminal 279 is connected via conductor 297; mode switch 259 when its wiper arm is in contact position 3, or simply contact 3 or position 3, the test and grade mode; and resistor 299 with the base of transistor 301. One lead, collector or emitter depending on polarity and type transistor, of transistor 301 is connected to the juncture of problem and correct answer solenoid 125 and one lead of transistor 305. The other lead of transistor 301 is connected to the base of transistor 305. The base of transistor 301 is also connected via conductor 307 and resistor 309 with the base of transistor 311. Transistor 305 and problem and correct answer solenoid 125 are connected serially to power source 191 and to ground. Thus, transistor 305 serves as switch means to energize solenoid 125, and transistor 301 serves as actuating means to turn on transistor 305. Transistor 311 is connected with the juncture of resistor 261 and resistor 263 and with ground to act as a switch therebetween. Conductor 297 extends upwardly from lower contact position 3 of mode switch 259 to the upper contact positions 1 and 2 of mode switch 259, which are, respectively, the tutor mode and the tutor, test and grade mode. Thus, the upper wiper arm of mode switch 259 will connect transistor 275 with the base of transistor 267 in the tutor mode and the tutor, test and grade mode. Terminal 279 is connected to contact position 2 of the lower set of contacts of mode switch 259 via conductor 313 and field effect transistor 315. Field effect transistor 315 has its inhibit lead, sometimes called the gate, connected via conductor 317 with memory capacitor 319. Thus, a memory means, including memory capacitor 319 and field effect transistor 315, is electrically connected in series with the correct answer switch means. The memory means is normally conductive but may be set for preventing the conveying of an appropriate signal by way of field effect transistor 315 to the problem and correct answer gear engaging means when a completed electrical connection is obtained through the programing network and the correct answer selector on an attempt other than the first attempt to answer a given problem when the mode selector means is in the tutor, test and grade mode.

The memory means includes a memory setting means. Specifically, memory capacitor 319 is connected via conductor 321 and diode 323 with one side of capacitor 325. Capacitor 325 is connected via conductor 327, resistor 329 and diode 331 to the solenoid timing circuit conductor 257 and to ground. Capacitor 325 thus serves as a primary component of a memory setting means electrically connected with the engaging means timing circuit and operable to charge the memory capacitor upon termination of the timing signal in the engaging means timing circuit.

The memory means also includes a memory resetting means. Capacitor 251 comprises a major component of the memory resetting means and is connected via diode 333, conductor 335 and resistor 337 with the base of transistor 339. Transistor 339 is connected across memory capacitor 319 so as to discharge the memory capacitor when transistor 339 is rendered conductive. Resistor 341 is connected to ground and to the juncture of resistor 337 and diode 333 to smooth operation of transistor 339 and facilitate proper biasing of its base and reduce collector-emitter leakage through transistor 339.

As an apprising means, two lamps are employed; a green lamp to denote a correct answer and a red lamp to denote an incorrect answer. Either lamp alone may be employed and the student will know by its failure to be energized that the opposite type answer was given. Specifically, the apprising means may include only one lamp which is energized upon registration of a correct answer. If it does not light the student will know that his answer was incorrect. On the other hand, the apprising means may include only one lamp which is energized upon registration of an incorrect answer. The student then knows his answer is correct if the incorrect lamp is not energized. It is preferred, however, to employ two lamps to eliminate the possibility that one of the lamps could have its filament burned out. It is desirable that the lamps be in an energized condition for a very short predetermined interval of time, and accordingly, the apprising means includes a timing circuit for maintaining the lamp which is energized in the energized condition for a short predetermined interval of time, which has been discussed hereinbefore.

At the time the lamp timing circuit is activated by conduction of transistor 205 power is also supplied via resistor 343 to the base of transistor 345 rendering it conductive. Transistor 345, SCR 291, green lamp 347, power source 191 and ground are serially connected. Thus, transistor 345 and SCR 291 form a switch means for lamp 347. Firing lead 289 of SCR 291 and the electrical connection to transistor 345 by way of resistor 343 form actuating means connected with the lamp timing circuit and with correct answer switch means in the form of transistor 275. SCR 291 and its firing lead 289 also serve as a latching means that, once pulsed, keeps the lamp energized for the duration of the lamp timing signal.

Transistor 345, transistor 349, red lamp 351, power source 191, and ground are also connected in series. Transistor 349 has its base connected via resistor 353 with the juncture of lamp 347 and SCR 291. Thus, transistor 345 and transistor 349 form a switch means for lamp 351. The electrical connection of the base of transistor 345 via resistor 343 with the lamp timing circuit and the connection of base of transistor 349 via resistor 353 through the filament of lamp 347 with power source 191 comprise a second actuating means electrically connected to the juncture of the first lamp and its switch means and to the lamp timing circuit.

Thus, a transistor and an AND gate can be similarly connected with each lamp to afford a switch means and an actuating means for the respective lamps and effect the same result. Latching means may be employed with the transistor and AND gate also.

Ordinarily, an appropriate number of machines is given each classroom by the eductional institution in which they are being employed. For example, 40 machines may be arranged in a cabinet to be given each classroom.

Figure 13:
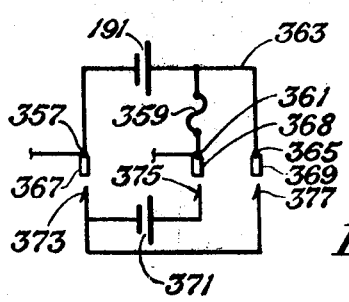
FIG. 13 is a schematic diagram illustrating the addition of an auxiliary power unit in one embodiment of the invention.

Engineering tests have indicated that the battery serving as power source 191 will last more than one year and perhaps as much as two to five years with the small amount of power required for operation of the system described hereinbefore. Even so, it is desirable to provide a means for affixing an auxiliary power source, should the battery become low enough in potential that the solenoid, the component requiring the greatest voltage to operate, should fail. In this way, the student cannot make an error and select and register an incorrect answer. Both he and the teacher are apprised that the battery is low in voltage by the failure of the problem gear to advance when any of the answers are selected and registered. A schematic illustrating an arrangement which facilitates affixing an auxiliary power source is shown in FIG. 13. Therein, battery 191 is connected with terminal 357 and in series via fuse 359 with a second terminal 361. Terminals 357 and 361 are the normal terminals for the circuit illustrated in FIG. 12. One terminal may be connected to ground and the other terminal connected directly to the electronic components in the circuit. Conductor 363 is connected in parallel with fuse 359 to a third terminal 365. To facilitate affixing an auxiliary power source, external receptacles 367–369 are connected with the respective terminals 357, 361, and 365. Auxiliary power source 371 is connected with respective bayonet probes 373 and 375 for insertion into receptacles 367 and 368 to be connected to terminals 357 and 361 so as to preserve electrical polarity. The juncture of auxiliary power source 371 and bayonet probe 373 is electrically connected with a third bayonet probe 377 for insertion into receptacle 369. Insertion of bayonet probe 377 into receptacle 369 provides a direct electrical short across fuse 359 and burns it out. This prevents reliance upon power source 191 in the future even though its no-load potential may rebuild, and makes it imperative on the teacher to have the power source 191 replaced.

It has been found that use of the system is facilitated by incorporation of a tunnel beneath the device employed by the student. In this way, the student may slide material containing the problems and multiple answers beneath the machine as he selects and registers his answer for each given problem. FIG. 14 illustrates the tunnel 379 beneath cabinet 381. The tunnel is effected by short legs 383 on cabinet 381. Legs 383 may be molded or cast integrally into a portion of cabinet 381 or may be affixed as by screwing into the base of cabinet 381.

In operation, as indicated hereinbefore, the teacher has a manual from which she selects the program she desires. Specifically, she determines the number of answers she would like to have for the problems to be presented and whether the material is to be given to the student in a tutor mode; in a test and grade mode; or in a tutor, test and grade mode.

Having selected the program, the teacher makes out her tests with the problem-correct answer sequence arranged in accord with the format illustrated in the teacher's manual for the particular program chosen.

The teacher then encodes the program into the encoding means in the system by employing her teacher's key and setting the first multi-deck switch 169 to the appropriate indicia; such as, a letter of the alaphabet; and setting the second multi-deck switch 175 to the appropriate indicia. This code is readily set into each machine provided for her respective classes.

Having set the code into the machines, the machines and the material are distributed to the first group of students who will ascertain that the machines are set on zero. As indicated, if they are not, the teacher may reset the machine with her key.

The student reads the first problem and selects his answer on answer selector dial 39. He depresses push-to-score button 43, rotating pinion 109 with rack 107 and ultimately rotating cam means 115. Cam means 115 bears against upright member 119 of bolt means 121. When cam means 115 is just past dead center several things happen almost simultaneously. This point is chosen before other events occurs so that the student cannot change his mind by hearing the clicking of a solenoid or seeing a light. On the mechanical side, bolt means 121 is biased by spring 140 to return to its original stop position and, hence, pushes cam means 115 before it in returning thereto. Cam means 115 rotates freely about ratchet means 113; thus, taking the initiative from the student and preventing the student's changing his mind. Simultaneously, microswitch 193 is closed, supplying power to lamp timing circuit 195 and firing SCR 237. This supplies power to the solenoid timing circuit conductor 257. Specifically, closing of microswitch 193 supplies power to ground via resistor 199, pulsing capacitor 201 and biasing "on" transistor 205. Transistor 221 is similarly biased "on," in turn biasing the base of transistor 205, affording a regenerative switch means, which remains "on" until timing capacitor 229 is discharged back to equilibrium.

Firing of transistor 205 supplies power to bias the base of transistor 345 and turn it on for the duration of lamp timing signal on lamp timing circuit 195.

If the answer chosen by the student is correct, AB switch 283 will be closed to bias the base of transistor 275 by way of resistor 281 to ground. Transistor 275 thus conducts to supply power to terminal 279. Power is supplied from terminal 279 by conductor 285 to firing lead 289 of SCR 291, turning it "on" and energizing green lamp 347. Green lamp 347 signifies to the student he has selected the correct answer.

The simultaneous supplying of power to the respective solenoid carried on arm 123 of bolt means 121 is determined by the position of mode switch 259. Specifically, mode switch 259 will be in either the test and grade mode, with its wiper arms on contact positions 3, FIG. 12; in the tutor, test and grade mode, with its wiper arms on contact positions 2; or in the tutor mode, with its wiper arms on contact positions 1. Thus, with mode switch 259 in the test and grade mode, contact position 3, as illustrated, power is supplied by conductor 265 and resistor 261 to the base of transistor 267 via resistor 263. Thus, transistor 267 will conduct if transistor 311 does not conduct to drop the bias to ground level.

The power supplied to terminal 279 is supplied via conductor 297 and wiper arm 258 at the lower contact position 3 and resistor 299 to the base of transistor 301 which conducts, biasing the base of transistor 305 and biasing the base of transistor 311. Thus, transistor 311 does conduct and drops the bias on resistor 263 to ground level preventing conduction of transistor 267.

At the same time, transistor 305 conducts and engages problem and correct answer solenoid 125. As can be seen in FIG. 7, pawl 127 engages teeth 133 and 135 on correct answer gear 99 and problem gear 87.

Thus, as bolt means 121 returns to its stop position it advances problem gear 87 and correct answer gear 99. Accordingly, the number 2 appears in the problem number display window 41 because problem number display disc 95 will have been advanced one unit. Similarly, correct answer number 1 will appear in correct answer display window 49 because correct answer display disc 101 will have been advanced to display the number 1. Simultaneously, program disc 51 will have been advanced the number of degrees equivalent to the next problem so a new set of segments will be contiguous with brushes 79 in interpreting head 77, also stopping the solenoid timing signal.

If, on the other hand, the answer selected is incorrect, AB switch remains open and correct answer switch means, illustrated by transistor 275, does not conduct power to terminal 279. Thus, SCR 291 does not fire and lamp 347 is not energized. Power is supplied via the filament of lamp 347 and resistor 353 to the base of transistor 349, rendering it conductive. Thus, red lamp 351 comes on since both transistor 345 and transistor 349 are conducting. Red lamp 351 will remain energized for the duration of the lamp timing signal, advising the student that he has selected the incorrect answer. Simultaneously, power is supplied to the base of transistor 267 as delineated hereinbefore. Since no power is supplied to terminal 279, transistor 301 does not conduct and transistor 311 does not conduct. Accordingly, the base of transistor 267 is biased and transistor 267 conducts, biasing the base of transistor 271. Accordingly, problem solenoid 129 is energized. As illustrated in FIG. 7, pawl 131 engages only a tooth 135 of problem gear 87. As bolt means 121 returns to its stop position, problem gear 87 is advanced the number of degrees equivalent to one tooth thereon. Accordingly, the number appearing in problem number display window 41 is advanced one entity. No credit is given to the correct answer and correct answer gear, correct answer number display disc does not advance, and the number appearing in correct answer display window 49 remains the same.

Since the problem gear advanced one unit, however, program disc 51 is advanced the number of degrees equivalent to one tooth. It effects the program for the next problem.

Thus, it can be seen that in the test and grade mode, the student is advanced to the next problem whether he gets a correct answer or an incorrect answer.

The student continues to answer the problems throughout the material given. At the end of the test, he returns the machine, with or without the material, to the teacher. The number of correct answers given is displayed in correct answer display window 49 so both the teacher and the student are apprised of the grade the student has made on the test immediately. After the grade is recorded, the teacher resets the machine with her key and places it in the cabinet for the next class. As indicated hereinbefore, resetting the gear and discs to the starting position also effects closure of pulsing switch means 247 with attendant resetting of the memory means.

If the tutor mode has been selected, mode switch 259 will have its wiper arms on contact position 1 in both the top and bottom set of contacts, illustrated in FIG. 12. The operation of the mechanical components are essentially the same to the point at which microswitch 193 is closed. Problem and correct answer solenoid 125 cannot be connected with a source of power in the tutor mode, since the lower wiper arm 258 is on contact position 1, which is dead end and cannot be connected with any source of power. Also, the solenoid timing signal cannot be transmitted through the upper set of contacts on mode switch 259, since the upper wiper arm is similarly positioned on contact position 1. Accordingly, the problem solenoid 129 cannot be energized until correct answer switch means 275 is rendered conductive by a correct answer, effectively closing AB switch 283. The red light will be energized upon the failure of the green light 347 to be energized as delineated hereinbefore, so the student is apprised each time that his answer is incorrect. When finally the student selects the correct answer, such that upon his selecting and registering the answer and closing microswitch 193, transistor 275 is rendered conductive by closed AB switch 283, power is supplied via conductor 297 to upper contact position 1. The upper wiper arm, conductor 265, resistor 261 and resistor 263 conduct the power to the base of transistor 267 rendering conductive transistor 271. Thus, problem solenoid 129 is energized. Energizing of problem solenoid 129 effects the advancement of problem gear 87, problem number display disc 95, and program disc 51. Accordingly, the student is ready to select and register an answer for the next problem.

If the tutor, test and grade mode has been selected, mode switch 259 will have its wiper arms on contact positions 2. The answer selection and registration is accomplished as delineated hereinbefore with respect to the other modes up to the closure of microswitch 193. Thereupon, power is supplied to the lamp timing circuit and to solenoid timing circuit conductor 257. Since the upper wiper arm of mode switch 259 is in position 2 power is not supplied directly to problem solenoid 129 as it was when the wiper arm was in the test and grade mode. Accordingly, operation of either solenoid is delayed until transistor 275 is rendered conductive by a correct answer, effectively closing AB switch 283. Upon each selection, however, lamp timing circuit 195 renders conductive transistor 345. Should green lamp 347 fail to be energized then red lamp 351 becomes energized by the rendering conductive of transistor 349 as delineated hereinbefore. Thus, each time the student selects and registers an incorrect answer, he is so advised.

In the event the answer selected and registered is correct the first time, transistor 275 is rendered conductive by closed AB switch 283, supplying power to terminal 279. The power supplied to terminal 279 effects the energization of green lamp 347 as delineated hereinbefore and apprises the student his answer is correct. It also supplies power via conductor 297 to upper position 2 on mode switch 259 so power can be supplied via upper wiper arm, conductor 265, and resistor 261 to the base of transistor 267 which will conduct if transistor 311 does not. Power from terminal 279 is supplied via conductor 313 to field effect transistor 315. Field effect transistor is conductive since memory capacitor 319 is not charged. Accordingly, power is conducted to the lower contact position 2, via wiper arm 258 and resistor 299 to the base of transistor 301. Transistor 301 is rendered conductive biasing the base of transistors 305 and 311, both of which conduct. Accordingly, problem and correct answer solenoid 125 is energized and problem solenoid 129 is not energized. Energization of problem and correct answer solenoid 125 effects engagement of pawl 127 with teeth 133 and 135 on correct answer gear 99 and problem gear 87, as delineated hereinbefore. Accordingly, both problem and correct answer gear are advanced by the return of bolt means 121 to its stop position. Advancement of both problem and correct answer gear advances problem number display disc 95, correct answer number display disc 101, and program disc 51.

The advancing of program disc 51 causes the passing of a pulsing contact 355, FIG. 6, contiguous with the brush monitoring pulsing track 61 on program disc 51. This is the equivalent of closing pulsing switch means 247, turning "off" SCR 237 and pulsing capacitor 251. Capacitor 251 discharges to ground and by way of diodes 255 and 333 biases the base of transistor 339 to render it conductive, discharging memory capacitor 319 which would otherwise be charged by the trailing edge of the solenoid timing signal pulsing capacitor 325 and causing capacitor 325 to discharge into memory capacitor 319. While this happens any time program disc 51 is advanced, it is of significance only in the tutor, test and grade mode where failure to obtain a correct answer on the first answer selection and registration will charge memory capacitor 319 to prevent obtaining credit for a correct answer on an attempt other than the first attempt. Thus, as far as external manifestations are concerned, the selection and registration of a correct answer where the previous attempt was correct, has the same results in the tutor, test and grade mode as in the test and grade mode.

If, however, the first attempt is incorrect, transistor 275 does not conduct so power is denied either problem and correct answer solenoid 125 or problem solenoid 129. Nothing happens except the red light apprises the student of an incorrect answer. It is to be noted, however, that since program disc 51 did not advance, pulsing switch means 247 did not close and power remains on the solenoid timing circuit conductor 257 and SCR 237 until the lamp timing circuit times out. At this time, power is no longer supplied via resistor 329 to capacitor 325. Accordingly, capacitor 325 discharges via diodes 323 and 331 into capacitor 319 to charge it with one-half the charge existing on capacitor 325. This charge is sufficient to inhibit conduction in field effect transistor 315 until memory capacitor 319 is discharged.

If a second incorrect answer is selected, again nothing happens except the red light apprises the student that his answer is incorrect and capacitor 325 is discharged, by the trailing edge of the solenoid timing signal on conductor 257, into memory capacitor 319 to charge it to a potential one-half the difference between its charge and that existing on capacitor 325.

When finally the student selects and registers a correct answer, AB switch 283 is closed, transistor 275 is conductive supplying power to terminal 279. Accordingly, green light 347 is energized advising the student his answer is correct. Power is supplied via conductor 297 to upper contact position 2 and upper wiper arm to the base of transistor 267. Power is simultaneously supplied via conductor 313, to field effect transistor 315. Field effect transistor 315 is inhibited by charged memory capacitor 319 and does not conduct power to the lower contact position number 2 and wiper arm 258. Accordingly, transistor 301 is not rendered conductive and transistors 305 and 311 are not rendered conductive. Consequently, problem solenoid 129 is energized since power biases the base of transistor 267 which in turn biases the base of transistor 271 and renders it conductive.

Energizing problem solenoid 129 has the consequences delineated hereinbefore. Specifically, problem gear 87 is advanced, advancing problem number display means 95 and program disc 51, closing pulsing switch means 247. Closing of pulsing switch means 247 renders conductive transistor 339, as delineated hereinbefore, and deactivates the memory means. Specifically, the rendering conductive of transistor 339 discharges memory capacitor 319 to allow credit for a correct answer if one is given the first time on the next problem.

As with the test and grade mode, the student finishes his material and the system apprises him and the teacher of the number of correct answers selected the first time. Thus, the results are valuable as a testing means. Additionally, the student is forced to select the correct answer before he is advanced to the next problem. Thus, the results are also valuable as a teaching means.

The recording of the grades and resetting of the devices for the next class are done as described hereinbefore.

As indicated hereinbefore, resetting the gears and discs to the starting position by use of the teacher's key effects closure of pulsing switch means 247, discharges the memory capacitor regardless of whether or not the last student selected an incorrect answer, and thereby enables a subsequent student to obtain credit for a first-time correct answer.

It can be seen that other electronic means can be employed to accomplish the ends effected by the specifically disclosed electronic means. For example, AND gates instead of the staged transistors can be employed to effect energization of the respective solenoids. Moreover, instead of employing a single solenoid 125 to effect engagement of both problem and correct answer gears, a single solenoid may be employed to engage the correct answer gear and a single solenoid employed to engage the problem gear such that both solenoids can be activated. This, however, effects a greater drain of power from power source 191 and is ordinarily not as desirable as the embodiment specifically disclosed. Furthermore, mechanical equivalents or fluidic equivalents; such as, hydraulic or pneumatic devices; can be employed to effect the results specifically described herein within purview of the respective modes.

Thus, it can be seen that although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a method of teaching a student wherein it is desirable to be able to teach, to test and grade, or to both teach, and test and grade by having said student select an answer from material having a plurality of problems and a plurality of answers for each problem, ordinarily including a correct answer and an incorrect answer, the improvement comprising the steps of:
   (a) setting a program specifying:
      (i) the number of possible answers for each problem,
      (ii) the problem-correct answer sequence, and
      (iii) the tutor mode; the test and grade mode; or the tutor, test and grade mode to be employed;
   (b) selecting and registering an answer to a given problem;
   (c) in the tutor mode, advising the student that the selected and registered answer is incorrect until he selects and registers the correct answer then advancing to the next problem;
   (d) in the test and grade mode, advising the student that the selected and registered answer is correct or incorrect in accord with his selection and the problem-correct answer sequence of said program, counting the correct answers, and advancing to the next problem;
   (e) in the tutor, test and grade mode, advising the student that the selected and registered first answer was correct if correct the first time, counting first time correct answers, and advancing to the next problem; and if not correct the first time, advising the student each time his selected and registered answer is incorrect until he selects and registers the correct answer than advancing to the next problem without counting the correct answer finally selected and registered; and
   (f) repeating step (b) with respect to the next problem.

2. In a method of teaching a student wherein it is desirable to be able to teach, to test and grade, or to both teach, and test and grade by having said student select an answer from material having a plurality of problems and a plurality of answers for each problem, ordinarily including a correct answer and an incorrect answer the improvement comprising the steps of:
   (a) setting a program specifying:
      (i) the number of possible answers for each problem,
      (ii) the problem-correct answer sequence, and
      (iii) the tutor mode, the test and grade mode or the tutor, test and grade mode to be employed;
   (b) selecting and registering an answer to a given problem;
   (c) if the first answer to a given problem is correct, informing the student the answer is correct;
      (i) if in the tutor mode, advancing the the next problem,
      (ii) if in the test and grade mode or the tutor, test and grade mode, crediting a correct answer and advancing to the next problem;
   (d) if the answer is incorrect, informing the student the answer is incorrect; and
      (i) if in the tutor mode, repeating step (b) with respect to the same problem until a correct answer is selected and registered, then proceeding to the next problem,
      (ii) if in the test and grade mode, advancing to the next problem,
      (iii) if in the tutor, test and grade mode;
         (A) activating a memory to prevent later obtaining credit for a correct answer to said given problem,
         (B) selecting and registering another answer for said given problem,
         (C) if incorrect, informing the student the answer is incorrect and repeating step (d) (iii) (B) and
         (D) if correct, informing the student the answer is correct, advancing to the next problem, deactivating said memory; and
   (e) repeating step (b) with respect to the next problem.

3. A method of instruction comprising:
   (a) selecting a program affording:
      (i) a number of answers for each problem,
      (ii) a problem-correct answer sequence, and
      (iii) a mode of operation of either tutor; test and grade; or tutor, test and grade;
   (b) providing a series of specific problems arranged in a problem-correct answer sequence in accordance with said program;
   (c) setting a programing network to effect said program and define whether a student selects and registers a correct answer or an incorrect answer for each of said specific problems;
   (d) having a student selected and register his selected answer sequentially to said specific problems through said programing network in accordance with one of said modes afforded by said program selected;
   (e) in the tutor mode, advising the student each time that his answer is incorrect until he selects and registers the correct answer, then advancing to the next problem;
   (f) in the test and grade mode, advising the student that his answer is correct or incorrect, counting the correct answers and advancing to the next problem; and
   (g) in the tutor, test and grade mode, advising the student that his first answer is correct, if correct the first time, counting first time correct answers, and advancing to the next problem; and if not correct the first time advising the student each time his answer is incorrect until he selects and registers the correct answer, then advancing to the next problem without counting the correct answer finally selected and registered.

4. A programable system effecting automated teaching and including the modes effecting testing and grading also, for use in conjunction with problem and answer material wherein a plurality of answers are provided for each problem, arranged in accordance with a given program, comprising:
- (a) an encoding means including a separable setting means, an answer selector means for selecting an answer to a given problem and a programing network that can be readily programmed by said separable setting means to:
    - (i) select the number of answers for each problem,
    - (ii) select one of many problem-correct answer sequences,
    - (iii) select a mode of operation of either tutor; test and grade; or tutor, test and grade, and
    - (iv) define whether an answer selected and registered on said answer selector means for a given problem is correct or incorrect;
- (b) problem number display means for displaying the number of a given problem;
- (c) correct answer number display means for displaying the number of correct answers selected and registered;
- (d) advancing means selectively operable for advancing either said problem number display means alone, both said problem number display means and correct answer number display means, or neither said problem number display means nor said correct answer number display means in accord with the mode selected and the correctness of the answer selected and registered; and
- (e) apprising means for showing whether a selected and registered answer of a given problem is correct or incorrect.

5. The system of claim 4 wherein said encoding means includes a program means having a plurality of segments in a first determinable condition and a plurality of segments in a second determinable condition disposed in a predetermined arrangement in a plurality of sections thereon, each section containing a plurality of segments, said program means being advanced by said advancing means when said problem number display means is advanced; and an interpreting head including a plurality of monitoring means, one for each predetermined section of said predetermined arrangement for monitoring whether a segment in said first determinable condition or a segment in said second determinable condition is contiguous to each said monitoring means.

6. The system of claim 4 wherein said encoding means includes a program disc having a plurality of many conducting segments and a plurality of many insulating segments disposed in a predetermined arrangement on a plurality of concentric circular tracks, said conducting segments each being connected with a common terminal, said program disc being advanced by said advancing means when said problem number display means is advanced; and an interpreting head including a plurality of brushes, one for each track, for monitoring whether an insulating segment or a conducting segment is contiguous to each said brush.

7. The system of claim 6 wherein there is provided a memory means operable in the tutor test and grade mode to prevent obtaining credit for a correct answer to a given problem if the first answer to that problem is incorrect and wherein said program disc contains plusing contacts arranged around one of said tarcks such that one of said pulsing contacts will effect deactivation of said memory means if activated, each time said program disc is advanced one increment, as by being moved to the following problem number.

8. The system of claim 5 wherein said encoding means also includes means providing a selectable plurality of conductive paths between said answer selector means and said program means.

9. The system of claim 8 wherein said means providing a selectable plurality of conductive paths includes scrambling switch means for reordering conductive paths between said answer selector means and said program means.

10. The system of claim 9 wherein said scrambling switch means comprise a plurality of multi-deck wafer switches.

11. The system of claim 10 wherein said separable setting means is a teacher's key appropriately indexed to facilitate setting a code for said program into said multi-deck wafer switches and to reveal said code only when said key is inserted onto shafts of respective ones of said wafer switches.

12. The system of claim 11 wherein two multi-deck wafer switches are employed, one of said wafer switches being positioned by said teacher's key to effect a given row and the other of said wafer switches being positioned to effect a given column in a two dimensional program.

13. The system of claim 4 wherein said advancing means comprises:
- (a) a bolt means rotatable in both directions about a shaft and biased in one direction to a stop position;
- (b) bolt moving means engaging said bolt means in said stop position and operable to advance said bolt means in a direction opposite said one direction for a predetermined distance;
- (c) a problem gear rotatable in both directions about the axis of said shaft and connected with said problem number display means;
- (d) a correct answer gear rotatable in both directions about the axis of said shaft and connected with said correct answer number display means;
- (e) problem and correct answer gear engaging means carried on said bolt means and operable to engage a tooth on each of said problem gear and said correct answer gear upon receipt of an appropriate signal and biased to disengage both said teeth after cessation of said signal; and
- (f) problem gear engaging means carried on said bolt means and operable to engage a tooth on said problem gear upon receipt of an appropriate second signal and biased to disengage said tooth after cessation of said second signal.

14. The system of claim 13 wherein said problem and correct answer gear engaging means comprises one solenoid and one pawl.

15. The system of claim 13 wherein said problem and correct answer gear engaging means comprises two solenoids each carrying a single pawl.

16. The system of claim 13 wherein a program means is connected with said problem gear so as to be advanced each time said problem gear is advanced, said program means having a plurality of segments in a first determinable condition and a plurality of segments in a second determinable condition disposed in a predetermined arrangement in a plurality of sections thereon each section containing a plurality of segments; and wherein an interpreting head including a plurality of monitoring means, one for each predetermined section of said predetermined arrangement, is provided for monitoring whether a segment in said first determinable condition or a segment in said second determinable condition is contiguous to each of said monitoring means.

17. The system of claim 13 wherein a program disc rotatable about said axis is connected with said problem gear so as to be advanced when said problem gear is advanced, said program disc having a plurality of conducting segments and a plurality of insulating segments disposed in a predetermined arrangement on a plurality of concentric circular tracks, said conducting segments each being connected with a common terminal; and an interpreting head including a plurality of brushes, one for each track, for monitoring whether an insulating segment or a conducting segment is contiguous to each said brush.

18. The system of claim 17 wherein said problem gear, said correct answer gear, said problem number display means, said correct answer number display means and said program disc are rotatable normally in said one direction to advance sequentially to the next problem and are rotated in a direction opposite to said one direction to be reset to a starting position.

19. The system of claim 17 wherein said predetermined distance is such that said problem and correct answer gear engaging means and said problem engaging means can engage the next succeeding tooth on said problem gear and said correct answer gear upon receipt of said appropriate signal whereby said gears are advanced the degrees equivalent to one tooth thereon.

20. The system of claim 13 wherein the number of teeth on said problem gear and said correct answer gear are at least equal to the number of problems with which said system will be employed.

21. The system of claim 20 wherein there are at least 102 teeth on said problem gear and at least 102 teeth on said correct answer gear and said system is employed with material having up to 100 problems.

22. The system of claim 17 wherein said program disc has a number of radial rows of segments at least equal to the number of problems with which said system will be employed.

23. The system of claim 22 wherein said program disc has at least 102 radial rows of segments around said plurality of tracks, and said program disc is contiguous to two rows of brushes, a first row of brushes monitoring segments on every second track on said program disc and the other row of brushes monitoring the remaining segments on the remaining tracks, said two rows of brushes being displaced with respect to each other a number of degrees equivalent to two radial rows of segments.

24. The system of claim 13 wherein said bolt moving means comprises a rotatable member with at least one eccentric protrusion to contact said bolt means and move said bolt means in a direction opposite to said one direction until said protrusion is past dead center, said eccentric protrusion being then freely rotatable so as to be displaced in front of said bolt means being returned by the bias in said one direction to said stop position.

25. The system of claim 17 wherein said problem gear, said correct answer gear, said correct answer number display means, said problem number display means and said program disc are movable to the starting position by said separable setting means after it has been inserted through an aperture to engage a means connected with said shaft.

26. The system of claim 25 wherein said problem gear, said correct answer gear, said problem number display means, said correct answer number display means and said program disc are moved to said starting position by engaging said separable setting means and rotating in a direction opposite to said one direction.

27. The system of claim 26 wherein said problem gear contains a protruding pin means traversing space adjacent a portion of said correct answer gear in normal advancement and said correct answer gear contains a protruding blocking means which is encountered by said protruding pin means when said problem gear is returned to the start-position to also return said correct answer gear to the starting position; and wherein a positive stop is provided at said starting position by engagement of a second pin means in said correct answer gear with a stop means removably attached to a frame supporting said system.

28. The system of claim 13 wherein said encoding means includes a mode selector means and said advancing means also includes discriminating means responsive to said mode selector means and said answer selector in said programing network and connected with said problem and correct answer gear engaging means and said problem gear engaging means for generating and conveying said appropriate signal to said problem and correct answer gear engaging means and for generating and conveying said appropriate second signal to said problem gear engaging means.

29. The system of claim 28 wherein said discriminating means comprises:
(a) an engaging means timing circuit activatable upon rotation of said bolt means and selectively electrically connectable via said mode selector means with said problem gear engaging means in the test and grade mode;
(b) correct answer switch means electrically connected with said engaging means timing circuit with said programing network and said answer selector, and with said apprising means for conducting power from said engaging means timing circuit to said apprising means when a completed electrical connection exists through said programing network and said answer selector, and selectively electrically connectable via said mode selector means with said problem gear engaging means in the tutor mode and in the tutor, test and grade mode, and selectively electrically connectable via said mode selector means to said problem and correct answer gear engaging means in the test and grade mode; and
(c) memory means electrically connected in series with said correct answer switch means and selectively electrically connectable via said mode selector means to said problem and correct answer gear engaging means in the tutor, test and grade mode for preventing said conveying of said appropriate signal to said problem and correct answer gear engaging means when a completed electrical connection is obtained through said programing network and said answer selector on an attempt other than the first attempt to answer a given problem when said mode selector is in the tutor, test and grade mode.

30. The system of claim 29 wherein said memory means includes a memory resetting means electrically connected with a pulsing switch means and wherein a program disc is provided having a pulsing contact to close said pulsing switch means each time said problem gear is advanced.

31. The system of claim 4 wherein said advancing means includes electronic elements requiring a source of power and wherein a battery is connected directly to a common and to said electronic elements such that said elements are in a state of readiness and whereby said battery cannot be depleted by inadvertently leaving on a power switch.

32. The system of claim 29 wherein a battery is connected directly to elements such that said elements are in a state of readiness when said engaging means timing circuit is activated and whereby said battery cannot be depleted by inadvertently leaving on a power switch.

33. The system of claim 4 wherein said apprising means comprises at least one lamp which is energized upon registration of a correct answer.

34. The system of claim 4 wherein said apprising means comprises at least one lamp which is energized upon registration of an incorrect answer.

35. The system of claim 33 wherein said apprising means comprises two lamps, one of which is energized upon registration of a correct answer and the other of which is energized upon registration of an incorrect answer.

36. The system of claim 35 wherein said apprising means includes timing means for maintaining said lamp in an energized condition for a predetermined interval of time.

37. The system of claim 36 wherein said predetermined interval of time is sufficient for light to be detected by the human eye but short enough to effect a minimal current drain from a power source.

38. The system of claim 37 wherein said predetermined interval of time is approximately 120 milliseconds.

39. The system of claim 13 wherein said problem gear and said correct answer gear are each correctly positioned after each movement by a centering assembly.

40. The system of claim 39 wherein each said centering assembly comprises a centering cylinder, a spring urging said centering cylinder toward said gear to engage the detent between adjacent teeth, and a socket housing said centering cylinder and said spring and removably connected with a frame means.

41. The system of claim 29 wherein said advancing means includes switch means for energizing said problem and correct answer gear engaging means and an actuating means for actuating said switch means, said actuating means being selectively electrically connectable with a correct answer switch means in the test and grade mode and in the tutor, test and grade mode; and a second switch means for energizing said problem gear engaging means, a second actuating means for actuating said second switch means, said second actuating means being selectively electrically connectable via said mode selector means with said engaging means timing circuit in the test and grade mode and with said correct answer switch means in the tutor, test and grade mode and in the tutor mode and inversely responsive to said actuating means to actuate said second switch means when power is applied to said second actuating means via said mode selector means and said actuating means does not actuate said switch means.

42. The system of claim 31 wherein said battery has one terminal connected to said common and the other terminal serially connected via a fuse with conductor means connected with said electronic elements and wherein there is provided a means for applying an auxiliary power source when said battery becomes depleted of energy, said means comprising a terminal connected in parallel with said fuse; with said auxiliary power source to be connected, so as to preserve polarity, with said common and with said conductor means and connected via an additional conductor means with said terminal so as to effect a direct short through said fuse and burn out said fuse.

References Cited
UNITED STATES PATENTS

| | | | |
|---|---|---|---|
| 1,749,226 | 3/1930 | Pressey | 35—9X |
| 2,564,089 | 8/1951 | Williams et al. | 35—9 |
| 2,877,568 | 3/1959 | Besnard et al. | 35—9 |
| 2,965,975 | 12/1960 | Briggs | 35—9 |

WM. H. GRIEB, Primary Examiner